United States Patent [19]

Sussman

[11] 3,938,242
[45] Feb. 17, 1976

[54] FABRICATION OF LIQUID CRYSTAL DEVICES

[75] Inventor: Alan Sussman, Princeton, N.J.

[73] Assignee: RCA Corporation, New York, N.Y.

[22] Filed: Sept. 27, 1973

[21] Appl. No.: 401,234

[52] U.S. Cl. .......... 29/576 R; 29/592; 350/160 LC; 427/124; 427/126; 427/166; 427/109; 428/1
[51] Int. Cl.² ........................................ C23C 13/02
[58] Field of Search ...... 350/160 LC; 117/201, 211, 117/221, 124 A, 124 T, 106 R; 427/124, 126, 109, 166; 428/1; 29/576, 592

[56] References Cited
UNITED STATES PATENTS

| | | | |
|---|---|---|---|
| 2,907,672 | 10/1959 | Irland et al. | 117/33.3 |
| 3,207,937 | 9/1965 | Hannam | 117/222 |
| 3,578,844 | 5/1971 | Churchill et al. | 350/160 LC |
| 3,625,591 | 12/1971 | Freiser et al. | 350/160 LC |
| 3,731,986 | 5/1973 | Fergason | 350/150 |

OTHER PUBLICATIONS

Janning, John L., "Thin Film Surface Orientation for Liquid Crystals," Applied Physics Letters, Vol. 21, No. 4, Aug. 15, 1972, pp. 173, 174.

*Primary Examiner*—Ralph S. Kendall
*Assistant Examiner*—John D. Smith
*Attorney, Agent, or Firm*—Glenn H. Bruestle; Birgit E. Morris

[57] ABSTRACT

A layer of unoxidized metal is provided on surfaces of the device in such manner as to possess an oriented microstructure capable of causing sympathetic alignment of the liquid crystal molecules. The metal layer is thereafter heated in the presence of oxygen, preferably in a device envelope sealing process, to oxidize the metal layer. The metal oxide layer is stable, in that it retains the molecular aligning characteristic, and is more transparent than the metal layer.

4 Claims, 1 Drawing Figure

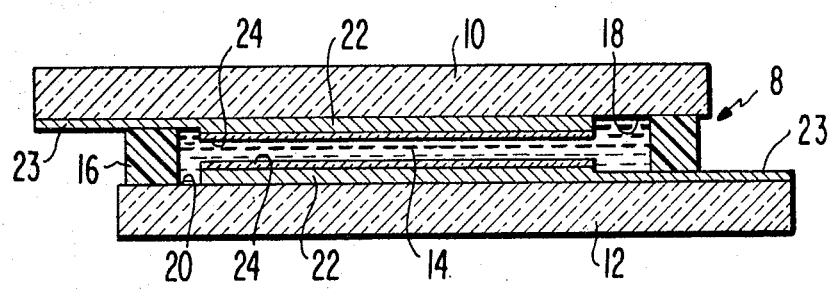

FABRICATION OF LIQUID CRYSTAL DEVICES

BACKGROUND OF THE INVENTION

This invention relates to liquid crystal devices, and particularly to liquid crystal devices of the type having surface aligned liquid crystal molecules.

One type of recently developed liquid crystal device, see U.S. Pat. No. 3,731,986, issued May 8, 1973 to Fergason (the disclosure thereof being incorporated herein), employs what is known as a "twisted" nematic liquid crystal material. Such devices comprise two closely spaced apart substrates sandwiching a thin film of liquid crystal material therebetween. The inner surfaces of the substrates are treated, as by directional rubbing, to influence and cause alignment of the liquid crystal molecules immediately adjacent to the substrates. In the "twisted" type device, the inner surfaces are so oriented with respect to one another that while adjacent molecules of the liquid crystal material are generally aligned with one another, the direction of the axis of alignment of the molecules gradually rotates or "twists" through some angle, e.g., 90°, from one substrate to the other. This angular rotation or "twist" of the axis of alignment of the molecules causes a corresponding angular rotation of the plane of polarization of linearly polarized light directed through the liquid crystal film. Moreover, by selectively applying an electric field through different portions of the film, these portions are "untwisted", with the result that the polarized light passing therethrough is not rotated. Removal of the electric field allows the liquid crystal material to return to its twisted state.

As noted, to obtain the desired alignment of the liquid crystal molecules at the substrate surfaces, it is necessary to "influence" or direct the alignment of the molecules at the substrates. This is done by treating the inside surfaces of the substrates to provide thereon some sort of "grained" microstructure having a definite axis of orientation along which the liquid crystal molecules align themselves. By arranging the microstructure orientation of the two substrates at a preselected angle with respect to one another, the proper twist through the liquid crystal film is obtained. In other types of devices, such as the "guest-host" type described in U.S. Pat. No. 3,551,026, issued on Dec. 29, 1970, the substrate surface orientations are disposed parallel to one another, and no twist is induced through the liquid crystal material.

One means to provide such an oriented microstructure on the substrate surfaces is the use of a process described in an article by John L. Janning, entitled "Thin Film Surface Orientation for Liquid Crystals", Applied Physics Letters, Vol. 21, No. 4, 15 August, 1972, at page 173, the disclosure of said article being incorporated herein. In this process, certain inorganic materials such as aluminum, gold, and silicon monoxide, are vacuum deposited to a thickness of 100A or less onto the substrates using a vapor deposition angle of approximately 5° to the plane of the surfaces to be coated, such process being referred to as "slant evaporation".

While the process described in the article is operative, it is found that certain disadvantages are presented when the process is used as described. For example, the metals disclosed in the article, even when deposited at very small thicknesses, are not transparent, or at least not significantly transparent, and are thus of limited utility in liquid crystal devices of the "transmissive" type, i.e., devices in which it is intended that light pass entirely therethrough with as little attenuation of brightness as possible. While silicon monoxide is transparent, experiments have shown that it is somewhat difficult to uniformly and reproducibly deposit such layers in a simple and inexpensive manner.

BRIEF DESCRIPTION OF THE DRAWING

The drawing shows a liquid crystal device, in cross-section, fabricated in accordance with this invention.

DESCRIPTION OF THE PREFERRED EMBODIMENTS

With reference to the drawing, a liquid crystal device 8 is shown comprising a pair of substrates 10 and 12, a film 14 of a liquid crystal material therebetween, and a bead 16 of fused glass hermetically sealing the liquid crystal material between the two substrates. The spacing between the substrates 10 and 12 is in the order of ½ mil (about 13 micrometers), the spacing being controlled either by the use of spacer members (not shown) between the substrates or by the glass bead 16 itself. Each of the inside surfaces 18 and 20 of the two substrates 10 and 12, respectively, is provided with an electrode 22 comprising a thin coating of a conductive material, e.g., tin oxide, an extension 23 thereof extending along the substrate surface to outside the bead 16 where electrical connection means, not shown, can be made thereto. Generally, while not shown herein, one or both of the electrodes 22 is patterned, i.e., partially removed to expose the underlying substrate surface, in the form of some image to be displayed.

The device 8 utilizes the twisted mode of liquid crystal material operation. To this end, each inside surface 18 and 20 of the two substrates 10 and 12 is treated to provide thereon an oriented microstructure which can align molecules of the liquid crystal. By "oriented microstructure" is meant to include microscopic grooves, ridges, scratches, peaks and valleys, and the like, which are generally parallel to one another and which are capable of causing sympathetic alignment of the liquid crystal molecules.

In accordance with this invention, such substrate oriented microstructures comprise a thin layer 24 of a metal oxide, such as aluminum oxide, covering the electrodes 22 on the substrates 10 and 12 and the portions of inside surfaces 18 and 20 of the substrates otherwise exposed through the electrodes. The metal oxide layer is provided by depositing a layer of the unoxidized metal itself, e.g., aluminum for an eventual layer 24 of aluminum oxide, substantially in accordance with the process described in the aforecited article by Janning; and the metal layer is thereafter heated in the presence of oxygen to convert the metal layer to the metal oxide.

While not known for sure, it is believed that the metal coating process results in a large number of tiny, parallel ridges of the deposited metal being formed on the substrate surfaces, the word "layer" being used to designate the deposited material, whether it is continuous from ridge to ridge or not. These parallel ridges provide an oriented microstructure along which the liquid crystal molecules align themselves. After being oxidized to the metal oxide layer 24, the layer 24 apparently retains the oriented microstructure provided in the deposited metal layer. In any event, the oxidized layer possesses the ability to cause sympathetic alignment therewith of the liquid crystal molecules.

Additionally, the metal oxide layer 24 is more transparent than the metal itself. In general, most metal oxides up to thicknesses of 300 A are transparent to light, such thicknesses being less than the wavelength of light in the visible spectrum.

In general, any of a number of metals which can be vacuum deposited and which form physically stable and transparent (when in the hundreds of Angstroms thickness range) oxide layers can be used in the practice of this invention. Examples of suitable metals are zinc, nickel, chromium, tin, lead, titanium, and preferably, for special ease of deposition, aluminum.

The fabrication of the device 8 is as follows. Starting with the two substrates 10 and 12 each having an electrode 22 and an electrode extension 24 thereon, provided by known means, a bead of glass frit is deposited along the edges of one of the substrates, as by silk screening. Then, using a vacuum vapor deposition at "glancing angles", i.e., a "slant evaporation" process such as described by Janning, the two substrates are coated on the inside surfaces thereof with a layer of metal.

It is noted that, while the Janning article describes the provision of various layers having thicknesses less than 100 A, it is found that deposited layers of metal having a somewhat higher thickness, e.g., at least up to 200 A, can be used. Also, while Janning describes the use of small vapor deposition angles, e.g., in the order of 5°, it is found that somewhat larger deposition angles, e.g., up to 45°, can be used.

The two substrates are then properly oriented with respect to one another, both with respect to alignment of the two electrodes 22 and angular displacement of the directions of orientation of the metal layers on the two substrates. Also, the two substrates are contacted with one another along the glass frit bead and, while applying compressive pressure to hold the substrates together, the assembly is heated in air to a temperature, dependent upon the glass frit used and generally in the range of 380°C to 540°C, to soften the bead and fusion seal the substrates together. The fused joint hermetically seals together the two substrates, a space, however, being provided therebetween to receive the liquid crystal material.

Additionally, the heating of the assembly, in the presence of oxygen, serves to convert the metal layer to the oxide. In the case of a deposited layer of aluminum, for example, the oxidizing process increases the thickness of the aluminum layer in the ratio of 1.5 to 1.0.

Thereafter, using a process such as that described in U.S. Pat. No. 3,701,368, issued to H. Stern on Oct. 31, 1972, the liquid crystal material is introduced into the space between the substrates, and the filling ports hermetically sealed off.

By virtue of the angular displacement of the microstructures on the inside surfaces of the two substrates, a corresponding angular rotation of the axis of alignment of the molecules of the liquid crystal material, i.e., the "twist effect", is automatically obtained. In the usual case, the substrate microstructures are oriented at an angle of 90° with respect to one another, a twist of 90° thus being produced through the liquid crystal material.

As known, the "twist effect" can be induced in any number of known liquid crystal materials possessing positive dielectric anisotropy. Examples of such materials are provided in the aforecited patent to Fergason and in an article by Schadt and Helfrich, page 127 of Applied Physics Letters, Vol. 18, Feb. 15, 1971.

In general, a major advantage of the instant invention is that it greatly simplifies the fabrication of devices having oriented microstructures which are highly transparent to light. Thus, it is somewhat easier to vacuum deposit metals such as those listed herein, but which are opaque, than to deposit such oxides as silicon monoxide which are transparent. Moreover, in devices of the type which are hermetically sealed using a heating process performed in air, the step of oxidizing the deposited metal layer can be done as part of the sealing step, thus introducing no extra steps or expenses in the practice of this invention.

What is claimed:

1. A method of fabricating a liquid crystal cell comprising:

vacuum depositing a layer of unoxidized metal on a surface of said cell in such manner to provide an oriented structure thereon along which the molecules of a liquid crystal material sympathetically align and, heating said metal layer in the presence of oxygen to convert said metal to a layer of metal oxide retaining said oriented structure and which is more transparent than said metal layer.

2. The method of claim 1 in which said metal is selected from the group consisting of zinc, nickel, chromium, tin, lead, titanium, and aluminum.

3. The method of claim 1 in which said metal is aluminum.

4. A method of fabricating a liquid crystal device comprising:

providing on each of two spaced apart surfaces of a device enclosure an electrode, slant evaporating on each of said electrodes a layer of unoxidized metal providing an oriented microstructure on said electrodes along which the molecules of a liquid crystal material sympathetically align, hermetically sealing together portions of said enclosure with a fused joint formed in the presence of oxygen and at a temperature sufficiently high to oxidize said metal layer to a layer of metal oxide having a higher light transparency than said metal layer and which retains said oriented microstructure, and introducing a liquid crystal material into said enclosure between said electrodes.

* * * * *